J. J. BAILEY.

Improvement in Refrigerating Apparatus.

No. 129,308.

Patented July 16, 1872.

Witnesses,

Inventor,

John J. Bailey,
Lemuel W. Serrell
atty.

UNITED STATES PATENT OFFICE.

JOHN J. BAILEY, OF NEW YORK, N. Y.

IMPROVEMENT IN REFRIGERATING APPARATUS.

Specification forming part of Letters Patent No. 129,308, dated July 16, 1872.

*To all whom it may concern:*

Be it known that I, JOHN J. BAILEY, of the city and State of New York, have invented an Improvement in Refrigerating Apparatus; and the following is declared to be a correct description of the same.

Ice-rooms and refrigerating-chambers have been made for containing meat and other articles that are liable to injury by heat and atmospheric changes. Heretofore it has been usual to construct these chambers with a box or ice-receptacle near the upper part, at one end, and provide an opening, through which the atmosphere in the chamber circulates; and it is presumed that any vapors condense on the ice and keep the atmosphere dry. I have found practically, and it has often been observed by others, that meat contained in refrigerators of this character becomes soft and damp, probably from the vapor thrown off from the ice while melting. My refrigerating apparatus is made for preventing moisture in the refrigerating-chamber, and for maintaining a uniform low degree in the temperature, so as to harden or freeze meat and other substances for their preservation. I make use of an ice-box running across the refrigerating-chamber near the upper part, at one end, and beneath this are pendent tubes connected together at their lower ends by a tube that is provided with a discharge-cock. The ice is introduced, preferably with salt, at the end of the box, and the same fills the tubes, cooling the chamber. In consequence of placing this apparatus in the upper part, at the end of the refrigerating-chamber, the space in that chamber is not materially lessened, and articles can be placed beneath these refrigerating-tubes, upon the bottom of the chamber.

Figure 1:
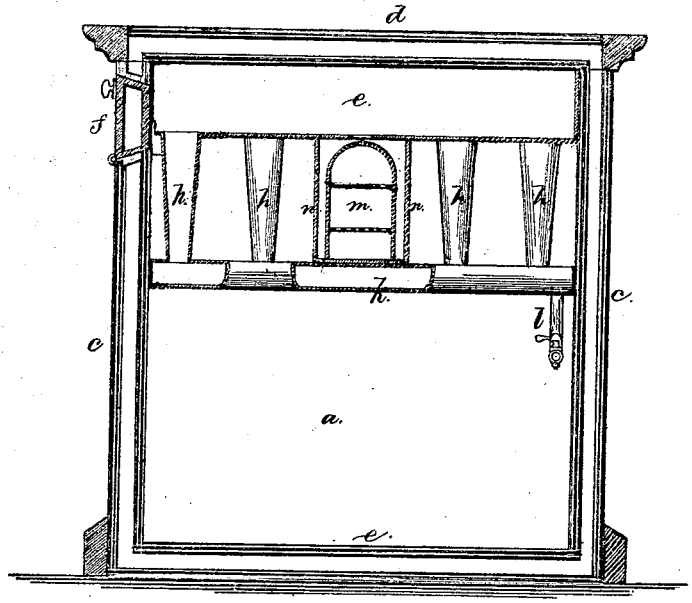
Figure 2:
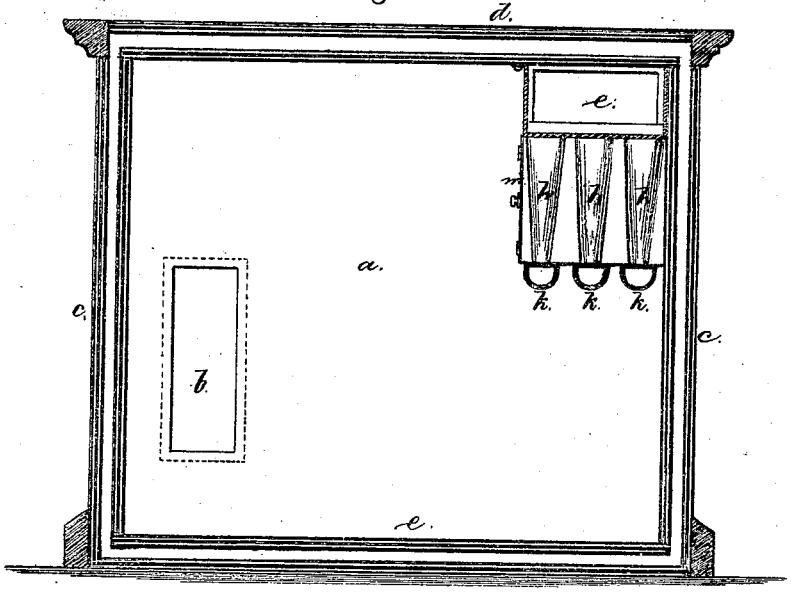

In the drawing, Figure 1 is a vertical section of the refrigerating apparatus, and Fig. 2 is a section transversely of the ice-box.

The refrigerating-chamber $a$ is made of any desired size; it may be in the form of a room or a box. I have represented the door at $b$, and the walls $c\ c$, ceiling $d$, and floor $e$ are to be made of non-conducting material, preferably double. The ice-box $e$ is of a size to reach across the end of the chamber $a$, or nearly so, and it is at or near the top, and provided with a door, $f$, at one end, to give access to the ice-box for introducing the ice or cleaning the chamber. The vertical tapering tubes $h$ open at their upper ends through the bottom of the ice-box, so that the ice passes into them; and at the bottom these tubes connect with the pipes $k$ that convey away water. The delivery-pipe $l$ should be provided with a cock for discharging the water, and it may also have an overflow-pipe rising to the desired height and passing off. The refrigerating-closet $m$ is made with double walls $n$, and into the space between these walls the ice passes, so as to cool or freeze any article introduced into said closet.

I do not claim refrigerating-tubes filled with ice and extending from the top to the bottom of the chamber.

I claim as my invention—

The refrigerating-closet, with hollow walls opening into the ice-box, applied to and combined with the ice-box and ranges of pendent tubes, as set forth.

Signed by me this 3d day of May, 1872.

JOHN J. BAILEY.

Witnesses:
GEO. T. PINCKNEY,
CHAS. H. SMITH.